(12) United States Patent
Hull

(10) Patent No.: US 7,096,120 B2
(45) Date of Patent: Aug. 22, 2006

(54) METHOD AND ARRANGEMENT FOR GUIDING A USER ALONG A TARGET PATH

(75) Inventor: Richard Hull, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 10/635,869

(22) Filed: Aug. 5, 2003

(65) Prior Publication Data

US 2004/0030491 A1    Feb. 12, 2004

(30) Foreign Application Priority Data

Aug. 6, 2002   (GB) ................................. 0218188.1
Oct. 11, 2002  (GB) ................................. 0223660.2

(51) Int. Cl.
  *G01C 21/26*   (2006.01)
(52) U.S. Cl. .................. 701/211; 701/207; 340/988
(58) Field of Classification Search ........ 342/385–386, 342/412, 407–408, 398; 705/14, 26–27; 701/207, 211; 340/988; G06F 17/60
See application file for complete search history.

(56) References Cited

U.S. PATENT DOCUMENTS

| | | | | |
|---|---|---|---|---|
| 1,942,327 A | * | 1/1934 | Drake ..................... | 455/233.1 |
| 2,107,155 A | * | 2/1938 | Kleinkauf et al. .......... | 342/407 |
| 2,489,248 A | * | 11/1949 | Abraham ..................... | 244/186 |
| 2,726,039 A | * | 12/1955 | Mosher ..................... | 701/218 |
| 2,784,307 A | * | 3/1957 | Burton ..................... | 375/216 |
| 3,108,223 A | * | 10/1963 | Hunter ..................... | 455/95 |
| 3,161,881 A | * | 12/1964 | Monroe et al. ............. | 342/435 |
| 3,247,464 A | * | 4/1966 | Morrison ..................... | 330/89 |
| 4,001,828 A | * | 1/1977 | Culpepper ................... | 342/446 |
| 4,021,807 A | * | 5/1977 | Culpepper et al. .......... | 342/458 |
| 4,023,176 A | * | 5/1977 | Currie et al. ............... | 342/443 |
| 4,106,023 A | * | 8/1978 | Baghdady ................... | 342/405 |
| 4,819,053 A | * | 4/1989 | Halavais .................... | 342/353 |
| 4,991,126 A | | 2/1991 | Reiter ........................ | 364/561 |
| 5,299,227 A | * | 3/1994 | Rose .......................... | 342/45 |
| 5,334,987 A | | 8/1994 | Teach ......................... | 342/357 |
| 5,577,961 A | * | 11/1996 | Adamczyk et al. ........... | 463/33 |
| 5,689,270 A | * | 11/1997 | Kelley et al. .......... | 342/357.09 |
| 5,889,843 A | | 3/1999 | Singer et al. ............... | 349/202 |

(Continued)

FOREIGN PATENT DOCUMENTS

AU    WO 01/55833 A1 *   8/2001

(Continued)

OTHER PUBLICATIONS

R. Anderson et al., GAINS instrumentation, AIAA International Balloon Technology Conference, Norfolk, VA, Jun. 28-Jul. 1, 1999 (Conf. Technical Papers A99-33301 Aug. 01).*

(Continued)

*Primary Examiner*—Cuong Nguyen

(57) ABSTRACT

An audio-based guide arrangement is provided for guiding a user along a target path by the use of virtual audio beacons. The user's current location is sensed and compared to the target path. Sounds are fed to the user, for example through stereo headphones, to simulate one or more audio beacons appearing to be located in a direction at least approximating the direction of the target path onward from the user's current position. Preferably, each successive location of the audio beacon is determined by determining a segment onward from the user's current position of a piecewise linear approximation to the target path, and setting the apparent location of the beacon at or relative to the end of this segment.

12 Claims, 3 Drawing Sheets

U.S. PATENT DOCUMENTS

| | | | |
|---|---|---|---|
| 6,133,867 A * | 10/2000 | Eberwine et al. | 342/29 |
| 6,314,406 B1 * | 11/2001 | O'Hagan et al. | 705/14 |
| 6,405,107 B1 * | 6/2002 | Derman | 701/3 |
| 6,490,513 B1 * | 12/2002 | Fish et al. | 701/35 |
| 6,513,015 B1 * | 1/2003 | Ogasawara | 705/26 |
| 6,539,393 B1 * | 3/2003 | Kabala | 707/102 |
| 6,594,044 B1 * | 7/2003 | Buchanan et al. | 398/58 |
| 6,741,856 B1 * | 5/2004 | McKenna et al. | 455/422.1 |
| 6,963,795 B1 * | 11/2005 | Haissig et al. | 701/7 |
| 7,009,980 B1 * | 3/2006 | Cao | 370/395.54 |
| 2002/0017989 A1 * | 2/2002 | Forster et al. | 340/540 |
| 2002/0037716 A1 * | 3/2002 | Mckenna et al. | 455/422 |
| 2002/0165731 A1 * | 11/2002 | Dempsey | 705/1 |
| 2002/0174021 A1 * | 11/2002 | Chu et al. | 705/26 |
| 2003/0086562 A1 | 5/2003 | Wong et al. | 379/420.01 |
| 2003/0223602 A1 | 12/2003 | Eichler et al. | 381/309 |
| 2004/0013232 A1 | 1/2004 | Craner | 379/142.01 |
| 2004/0030491 A1 * | 2/2004 | Hull | 701/207 |
| 2005/0120200 A1 * | 6/2005 | Brignone et al. | 713/154 |
| 2005/0151662 A1 * | 7/2005 | Kashuba et al. | 340/690 |

FOREIGN PATENT DOCUMENTS

| | | |
|---|---|---|
| CN | 1600640 A * | 3/2005 |
| EP | 0 503214 A1 | 9/1992 |
| GB | 2 219 658 A | 12/1989 |
| GB | 2 287 535 A | 9/1995 |
| GB | 2 382 288 A | 5/2003 |
| JP | 07-019887 | 1/1995 |
| JP | 07-057190 | 3/1995 |
| WO | 97/43599 | 11/1997 |
| WO | 99/67904 | 12/1999 |
| WO | 01/35600 A2 | 5/2001 |
| WO | 01/55833 | 8/2001 |

OTHER PUBLICATIONS

Azuma et al., Advanced human-computer interfaces for air traffic management and simulation, American Institute of Aeronautics and Astronautics, 1996.*

Naomi Ehrich Leonard et al., Virtual leaders, artificial potentials and coordinated control of groups, Proc. 40th IEEE Conf. Decision & Control, 2001, p. 2968-2973.*

Ogren et al., Obstacle avoidance in formation,. Proc. IEEE International Conference on Robotics & Automation, 2003 (6 pages).*

Naomi Ehrich Leonard, Optimization & Systems Theory Semincar, the abstract, Apr. 27, 2001 (1 page).*

Petter Ogren et al., A tractable convergent dynamic window approach to obstacle avoidance, Proceedings of IEEE IROS, Oct. 2002 (6 pages).*

Ross, D.A. et al., Evaluation of orientation interfaces for wearable computers, IEEE Explore, The 4th International Symposium on wearable computers, Oct. 16, 2000-Oct. 17, 2000 at Atlanta, GA, USA.*

Mirjana Spasojevic et al., A study of an augmented museum experience, Internet and Mobile Systems Laboratory, Hewlett-Packard Laboratories, Palo Alto, CA 94304, USA (6 pages).*

Benjamin B. Benderson, Audio augmented reality: a prototype automated tour guide, Feb. 21, 2002 from http://www.cs.umd.edu/ (4 pages).*

R. Dan Jacobson, Talking tactile maps & environmental audio beacons: . . . , Intitue of earth studies, Univ. of Wales Aberystwyth, Ceredigion, SY 23 3DB, UK, published date Mar. 30, 1999 from ica-llub.doc (22 pages).*

R Dan Jacobson et al., GIS & people with visual impairments or blindness . . . , School of Geosciences, Queen's University of Belfast, UK, Pearson Professional Limited 1997 (18 pages).*

Ross et al., Development of a wearable computer orientation system, Personal and Ubiquitous Computing, vol. 6 No. 1 p. 49-63, 2002 (from Dialog(R) File 2 acc. No. 08286003).*

Payton et al., Pheromone robotics, Proceedings of the SPIE, vol. 4195, p. 67-75, published 2001 (from Dialog(R) File 2, acc. No. 08044009).*

Wichtel et al., Virtual beacons for RTI/VHS data distribution, IEEE published on 1994 (from Dialog(R) File 2 acc. No. 05839887).*

Engel, Image features as virtual beacons for local navigation, Proc. of the SPIE, vol. 1002, p. 626-33, published in 1989 (from Dialog(R) File 2, acc. No. 04418939).*

Shu Du, Routing in large-scale ad hoc networks based on a self-organizing coordinate system, Rice University, vol. 42/05 of Masters Abstracts, p. 1748 (from Dialog(R) File 35, acc. No. 02002572).*

Dorfmuller et al., Real-time hand and head tracking for virtual environments using infrared beacons, published in 1998 (from Dialog(R) File 34, acc. No. 08029802).*

Wall et al., Integrated communications architecture for road transport informatics, Vehicle Navigation & Information Systems Conference Proceedings, Part 2 (of 2)—Proceedings—Society of Automotive Engineers n P-253 pt 2, published in 1991 (from Dialog(R) File 8, acc. No. 03431396).*

"Learning's in the air: museums, microcosms, and the future f the mobile net," Mpulse: A Cooltown Magazine, INTERNET: <http//www.cooltown.com/mpulse/0901-museums.asp?print=yes>3 pages total (Mar. 13, 2002).

"Radar Recollections—A Bournemouth University / ChiDE/ HLF project," INTERNET: <http://chide.bournemouth.ac.uk/Oral_History/Talking_About_Technology/radar_research/glossary.html>10 pages total (Jul. 18, 2003).

Bederson, B.B., "Audio Augmented Reality: A Prototype Automated Tour Guide," ACM Human Computer in Computing Systems conference (CHI '95), pp. 210-211, INTERNET: <http://www.cs.umd.edu/-bederson/papers/chi-95-aar/index.html> 4 pages total (Feb. 2, 2002).

Ross, D.A., et al., "Evaluation of orientation interfaces for wearable computers," The Fourth International Symposium on Wearable Computers 2000, IEEE, pp. 51-58 (2002).

Spasojevic, M., et al., "A Study of an Augmented Museum Experience," 6 pages total.

U.S. Serial No. 10/635,874, filed Aug. 5, 2003, Hull.

* cited by examiner

METHOD AND ARRANGEMENT FOR GUIDING A USER ALONG A TARGET PATH

FIELD OF THE INVENTION

The present invention relates to a method and arrangement for guiding a user along a target path such as, for example, a path through an exhibition space.

BACKGROUND OF THE INVENTION

In many mobile computing applications, there may be a requirement that users follow a particular path through a physical space. However, the physical space may be devoid of physical signs to indicate a specified path though that space. There are many uses of audio to guide navigation, including the use of audio beacons to attract users to its source, and the use of sonar to indicate obstacles ahead. A system of audio cues known as the "Oboe" system was also used in the Second World War to guide the pilots of RAF (the British Royal Air Force) bombers to targets; in this system monaural audio cues were presented to the pilot through headphones and represented three ternary states, namely: turn left, turn right, and straight ahead.

It is an object of the present invention to provide sound based cues for guiding a user along a target path.

SUMMARY OF THE INVENTION

According to a first aspect of the present invention, there is provided a method of guiding a user along a target path, comprising the steps of:
(a) determining the position of the user relative to the target path;
(b) determining a location at which to position a virtual audio beacon such that it lies in a direction at least approximating the direction of the target path onward from the user's current position; and
(c) rendering, through audio output devices carried by the user, an audio beacon at the location determined in step (b).

According to a second aspect of the present invention, there is provided an arrangement for guiding a user along a target path, the arrangement comprising:
user-location determining means for determining the position of the user relative to the target path;
beacon-location determining means for determining a location at which to position a virtual audio beacon such that it lies in a direction at least approximating the direction of the target path onward from the user's current position; and
audio-beacon means comprising audio output devices carried by the user for rendering a virtual audio beacon at the location determined by the beacon-location determining means.

According to a third aspect of the present invention, there is provided a method of guiding a user along a target path, comprising the steps of:
(a) determining the position of the user relative to the target path;
(b) determining a location at which to position a virtual audio beacon such that it lies in a direction at least approximating the direction of the target path onward from the user's current position, this determination involving effecting at least a partial piecewise linear approximation of the target path and determining the said location for the audio beacon at or relative to the end of a segment of that approximation on or closest to which the user is currently positioned; and
(c) rendering the audio beacon at the location determined in step (b) through audio output devices carried by the user.

According to a fourth aspect of the present invention, there is provided a method of guiding a user along a target path, comprising the steps of:
(a) determining the position of the user relative to the target path;
(b) determining locations at which to position multiple virtual audio beacons such that the audio beacons together form a succession of beacons with each beacon being successively further down said target path onward from the user; and
(c) rendering audio beacons at the locations determined in step (b) through audio output devices carried by the user.

According to a fifth aspect of the present invention, there is provided a method of guiding a user along a target path, comprising the steps of:
(a) determining the position of the user relative to the target path;
(b) determining a location at which to position a virtual audio beacon such that it lies in a direction at least approximating the direction of the target path onward from the user's current position, this determination taking into account potential obstructions whereby no such obstructions lie between the user and the audio beacon; and
(c) rendering the audio beacon at the location determined in step (b) through audio output devices carried by the user.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
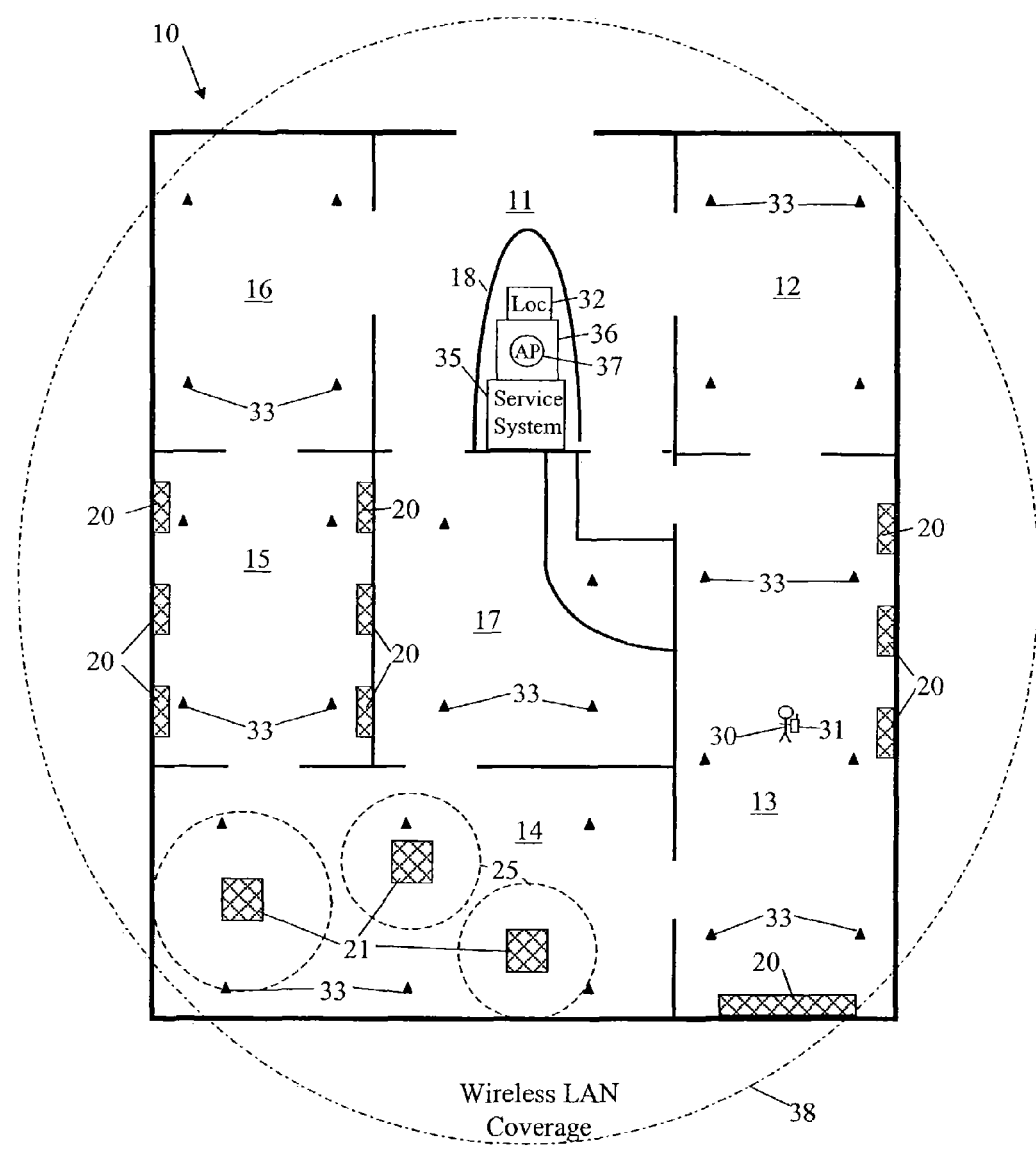
FIG. 1 is a diagram of an exhibition hall having an arrangement for delivering relevant media objects to visitors in a timely manner as the visitors encounter items of interest in the hall.

FIG. 1 depicts an exhibition hall 10 having rooms 11 to 17 where:
room 11 is an entrance foyer with reception desk 18;
room 12 is a reference library;
rooms 13, 14 and 15 are used for displaying exhibits in the form of real-world objects, namely paintings 20 and sculptures 21;
room 16 is empty of real-world exhibits; and
room 17 is a cafeteria.

On entering the exhibition hall 10, a user 30 collects a mobile device 31 from the reception desk 18 (or the user may have their own device). This device 31 cooperates with location-related infrastructure to permit the location of the user in the hall 10 to be determined. A number of techniques exist for enabling the location of the user to be determined with reasonable accuracy and any such technique can be used; in the present example, the technique used is based on an array of ultrasonic emitters 33 (represented in FIG. 1 by black triangles) positioned at known locations in each room (typically suspended above human level). The emitters 33 are controlled by controller 32 to send out emitter-specific emissions at timing reference points that are indicated to the mobile device 31 by a corresponding radio signal sent by the controller 32. The device 31 is capable of receiving both the timing reference signals and the emissions from the ultrasonic transmitters 33. The device 31 is also pre-programmed with the locations of these emitters and is therefore able to calculate its current location on the basis of the time of receipt of the emissions from the different emitters relative to the timing reference points.

The exhibition hall is equipped with a wireless LAN infrastructure 36 comprising a distribution system and access points 37. The wireless LAN has a coverage encompassing substantially all of the hall 10, the boundary of the coverage being indicated by chain-dashed line 38 in FIG. 1. The wireless LAN enables the mobile device to communicate with a service system 35 to download feature items (digital media objects) appropriate to any feature (such as an exhibit 20 or 21) corresponding to the current location of the user. In the present example, the determination of when the location of the user (as determined by the device 31 in the manner already described) places the user near a feature with associated feature items, is effected by the service system; however, it is also possible to have the device 31 carry out this determination provided it is supplied with the appropriate information about feature location.

It will be appreciated that communication between the device 31 and service system 35 can be effected by any suitable means and is not limited to being a wireless LAN.

Figure 2:
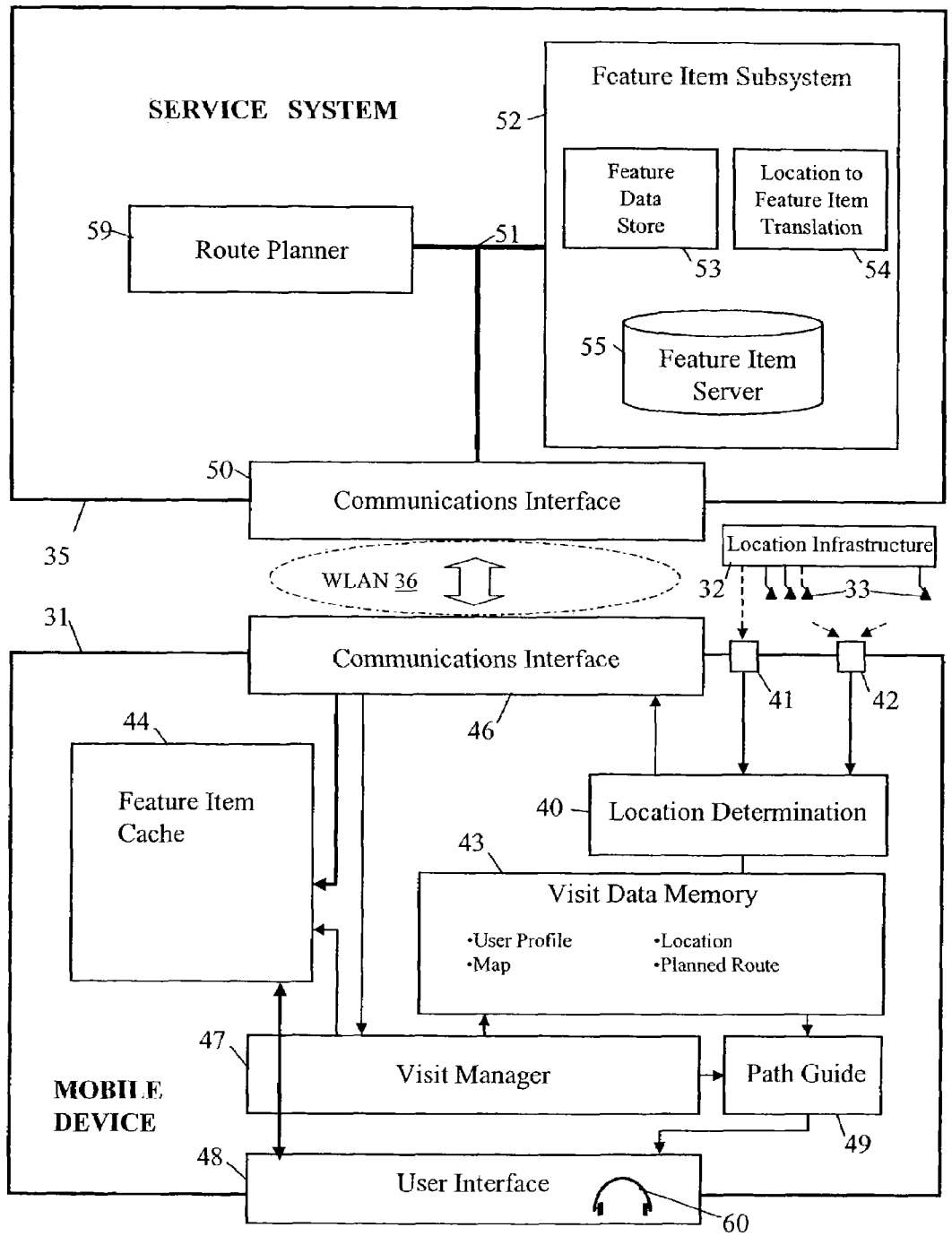
FIG. 2 is a diagram of a mobile device and service system used in the FIG. 1 arrangement.

FIG. 2 shows the mobile device 31 and service system 35 in more detail. More particularly, the mobile device 31 comprises the following functional blocks:

A location determination subsystem 40 with an associated timing reference receiver 41 and ultrasonic receiver 42 for receiving the timing reference signals from the location infrastructure 32 and the emissions from the ultrasonic emitters 33 respectively; the location determination subsystem 40 is operative to use the outputs of the receivers 41 and 42 to determine the location of the mobile device (as already described above) and to send location reports to the service system 35.

A visit data memory 43 for holding data about the current "visit"—that is, the current tour of the hall 10 being undertaken by the user of the mobile device 31.

A feature-item cache 44 for caching feature items delivered to the mobile device 31 from the service system 35.

A communications interface 46 for enabling communication between the mobile device 31 and the service system 35 via the wireless LAN infrastructure 36.

A user interface 48 which may be visual and/or sound based; in one preferred embodiment the output to the user is via stereo headphones 60.

A visit manager 47 typically in the form of a software application for providing control and coordination of the other functions of the mobile device 31 in accordance with input from the user and the service system 35.

A visit path guide 49 for giving the user instructions/indicators for following a planned route around the hall 10.

Much of the foregoing functionality will typically be provided by a program-controlled general purpose processor though other implementations are, of course, possible.

The visit data held by memory 44 will typically include a user/device profile data (for example, indicating the subjects of interest to the user, the intended visit duration, and the media types that can be handled by the device), an electronic map of the hall 10, the user's current location as determined by the subsystem 40, and details of a planned route being followed by the user.

The service system 35 comprises the following main functional elements:

A communications interface 50 for communicating with the mobile device 50 via the wireless LAN infrastructure 36.

An internal LAN 51 (or other interconnect arrangement) for interconnecting the functional elements of the service system.

A feature-item subsystem 52 for providing feature items to a user according to their current location. This subsystem 52 comprises a feature data store 53 for storing data about each feature of interest in the exhibition hall 10, a location-to-feature item translation unit 54, and a feature-item server 55 for serving an identified feature item to the mobile device 31. The data held by store 53 on each feature typically includes a feature identifier, the subject of the feature, the corresponding real-world location and a list of one or more feature items associated with the feature.

A route planner 59 for responding to requests from the mobile device 31 for a route to follow to meet certain constraints supplied by the user (such as topics of interest, time available, person or tour to follow, an exhibit or facility to be visited, etc). In providing a planned route, the route planner will typically access data from feature data store 53. The route planner 59 can conveniently hold a master map of the hall 10 for use by itself and for download to each mobile device 31 at the start of each new visit and/or whenever the master map is changed.

The functional elements of the service system 35 can be configured as a set of servers all connected to the LAN 51 or be arranged in any other suitable manner as will be apparent to persons skilled.

It is to be understood that the split of functionality between the mobile device 31 and service subsystem 35 can be varied substantially form that indicated for the FIG. 2 embodiment; indeed all functionality can be provided either entirely by the mobile device 31 (with all feature items being stored in the device) or by the service system 35 (with the presentation of feature items to a user being by means of fixed input/output devices located around the hall near the locations associated with the features concerned).

In general terms, a user starting a visit can request a route to follow using the user interface 48 of the mobile device 31 to indicate parameters to be satisfied by the route. This route request is sent by the visit manager to route planner 59 and results in the download to the mobile device 31 of a planned route. The path guide 49 then provides the user (typically, though not necessarily, only when asked) with guide indications to assist the user in following the planned route. Where the interface 48 includes a visual display, this can conveniently be done by displaying a map showing the user's current location and the planned route; in contrast, where only an audio interface is available, this can be done by audio cues to indicate the direction to follow. A user need not request a planned route and in this case will receive no guide indications. A user may request a route plan at any stage of a visit (for example a route to an exhibit of interest).

As the user moves through the hall, the location determination subsystem 40 sends periodic location reports (see FIG. 3) to the feature-item subsystem 52 of the service system 35 via the wireless LAN 36. When a location report is received by the subsystem 52, it passes on the user's current location to the feature translation unit 54 which queries the feature data store 53 to determine which feature, if any, is currently being visited by the user and thus what feature items are relevant to the user in their current location. The identities of feature items identified by the unit 54 are then either used to cause the feature-item server 55 to send the corresponding feature items to the device 31 directly, or are passed back to the visit manager 47 of the device 31 which is then responsible for causing the corresponding feature items to be retrieved from the server 55. In either case, whenever the device receives a feature item it stores it in memory 44 and presents it (with or without user prompting) to the user via interface 48.

Having described the general operation of the mobile device 31 and service system 35, a more detailed description will now be given of how a user can be guided along a route by an audio-based implementation of the path guide unit 49 of device 31.

However a route is determined by the route planner 59, details of the planned route are passed back to the mobile device 31 for storage in the memory 43. Alternatively, a route to follow may have been determined in the device itself, for example by the user specifying on the stored map locations to be visited and the visit manager 47 locally determining the shortest path between these locations. Typically, the route will have been specified by a series of locations defining a path. The path guide unit 49 is operative to use these stored details to provide guidance to the user for following the path concerned. Whilst the path guide unit 49 can be arranged to use a visual display of user interface 48 to provide this guidance, an audio-based embodiment of unit 49 is described below for using non-verbal audio output to guide a user along a specified path (referred to below as the "target" path).

Figure 3:
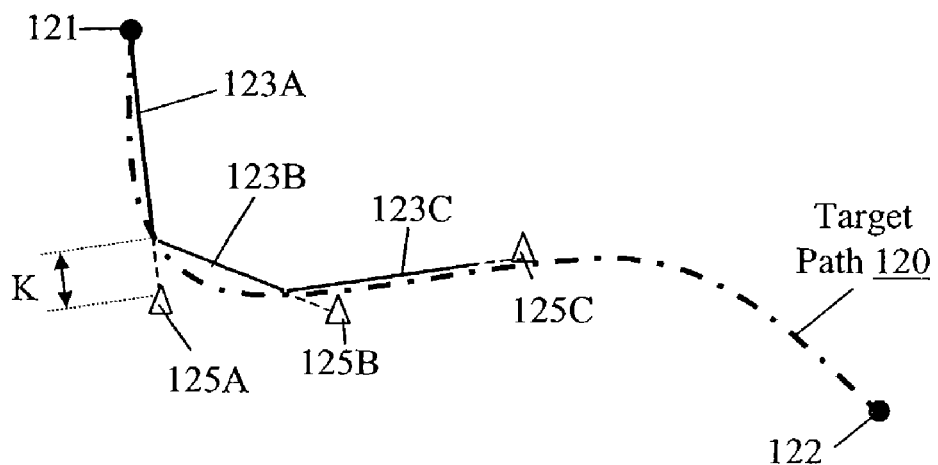
FIG. 3 is a diagram showing a target path to be followed by the user using audio guidance sounds generated by an audio-based embodiment of a path guide unit of the FIG. 2 mobile device.

In the audio-based embodiment of the path guide unit 49, a 3D audio spatialisation processor is used to project a virtual audio beacon ahead of the user along the target path. As the user approaches (or arrives at) the location of the virtual beacon, the beacon is repositioned further along the path. This process repeats until the user has traversed the entire path. The user is preferably guided along the whole length of the path, both where the path is not physically defined (for example, in the middle of a hall) and where the path is physically defined (for example, in a corridor). The process is illustrated in FIG. 3 in which the target path is indicated by chain-dashed line 120 passing from start point 121 to end point 122, and a partial piecewise linear approximation of the target path is indicated by lines 123A, 123B and 123C; as will be seen from the following description, the user is guided to follow this piecewise linear approximation rather than the exact target path.

When the user is positioned at start point 121 and the unit activated for guiding the user along target path 120, the unit determines at least a first segment 123A of the piecewise linear approximation to the target, this approximation being generated according to a heuristic which, for example, both keeps the area between this first segment and the target path to below a predetermined limit value, and keeps the length of the segment to no more than a predetermined maximum length. After determining this first segment 123A, the unit 49 determines a position 125A for a virtual sound beacon such that it lies a fixed distance "K" beyond the end of the first segment 123A in the direction of extent of the latter. The unit 49 then uses its 3D audio spatialisation processor to produce a world-stabilised virtual sound beacon at this position 125A in the sound field of the user, the output of the 3D audio spatialisation processor being via stereo headphones 60 or other suitable audio output devices (such as the shoulder mounted speakers previously mentioned). Also as previously mentioned, in order to render the virtual beacon in a world stabilized position, the unit 49 is provided with the direction of facing of the user's head or body, depending on where the audio output devices are carried. An electronic compass mounted with the audio output devices can be used to provide the required direction of facing data to the unit 49.

As a result, regardless of the direction of facing of the user, the user is provided with a sound beacon positioned in space to indicate the direction in which the user should move to follow the target path 122.

The user now sets off towards the position 125A of the virtual sound beacon. Upon the user approaching to within distance "K" of the sound beacon, the above process is repeated with the user's current position being taken as the start of the target path (whether or not actually on the target path). Thus, a second linear piecewise approximation segment 123B is determined and the virtual sound beacon is re-positioned to appear to be at a location 125B a distance "K" beyond this newly-determined segment in the direction of extent of the latter.

In this manner, the virtual sound beacon is moved in a succession of steps to guide the user along a piecewise linear approximation of the target path until the user reaches the path end point 122.

It should be noted that where the target path includes a long straight section, this will be split up into several segments by the above process in order to keep the segment level down to the aforesaid predetermined maximum length thereby ensuring that the virtual sound beacon is never more than that distance plus the value "K" beyond the user. This is illustrated in FIG. 3 by the third segment 123C for which the virtual beacon has been located at a position 125C which is only part way along a straight section of the target path.

Many variants are possible to the above-described embodiment of the path guide unit 49. For example, the distance "K" may have a value of zero.

Furthermore, the unit 49 can advantageously be arranged to check that no obstruction exists between the current location of the user and the position, or proposed position, of the sound beacon. This check is made using the electronic map of the hall 10 held in the visit data memory 43, obstructions (or what are to be treated as obstructions) being marked on this map. If the unit 49 determines that the straight line path from the user to the sound beacon passes through an obstruction, the unit 49 modifies the position (or proposed position) of the beacon until this is no longer the case. This check can be carried out either simply when the beacon is first positioned or on a continuous basis each time the user's location is determined. Of course, rather than a check being carried out in respect of a particular location of the audio beacon, the position of the latter can be chosen such that it lies outside a "dead zone" of locations formed by the shadow of the obstruction (considering the user as a point "light source").

Figure 4:
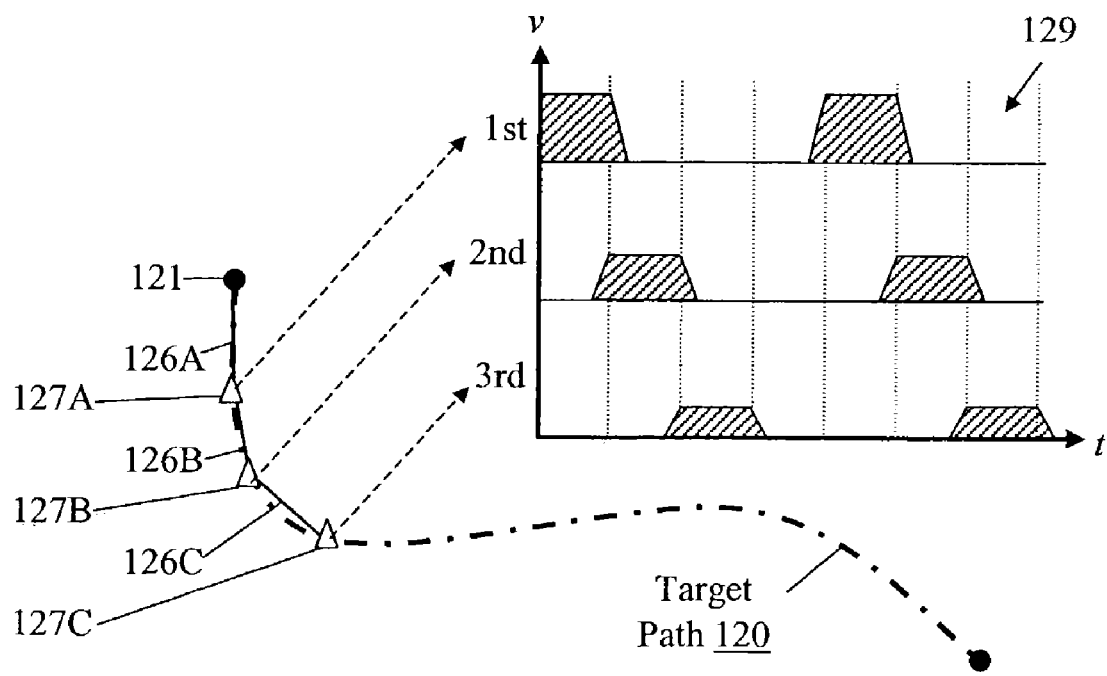
FIG. 4 is a diagram showing, for a variant of the FIG. 3 path guide unit, the sounds produced by three virtual sound beacons to provide audio guidance to the user.

In another variant, rather than providing only a single virtual sound beacon, one or more further beacons can be provided beyond the first beacon, for example, at positions at the end of (or a distance "K" beyond) second and third segments of the piecewise linear approximation of the target path—in this case, the maximum length of each path segment will typically be less (for example, half) of that used in the case where only a single virtual beacon is being presented. For example, and as illustrated in FIG. 4 for target path 120, three virtual sound beacons can be used each positioned at the end of a corresponding piecewise linear approximation segment, the first three of these segments 126A, B and C being shown with the beacons located at positions 127A, 127B and 127C corresponding to the end of respective ones of these segments.

The beacons can be caused to vary in intensity, frequency, or some other audible characteristic, to indicate the order in which they should be approached with each beacon sounding in turn (potentially with overlap) in a cyclic manner with the further sounds being quieter. In the FIG. 4 example, graph 129 indicates the variation of sound volume v with time t for each of the first, second and third beacons (the first beacon being the one nearest the user along the target path and third beacon being the one furthest away from the user along the target path). The sound frequency (or other audible characteristic) can be varied in conjunction with changes with the volume of each beacon to represent distance between the beacon and the user, the sound frequency decreasing, for example, as the user approaches the beacons.

The virtual beacons are rendered to appear static and as the user approaches or reaches the first, it is removed and replaced by a new distant virtual sound beacon, last in the series of three beacons, positioned at the end of a further piecewise linear approximation segment. The new beacon may be caused to appear just before, at the same time as, or just after the first beacon is caused to disappear. This process of replacing beacons as they are approached or reached is repeated as the user moves along the target path.

The above-described check for obstructions can, of course, also be carried out where multiple beacons are being used.

As a further general variant, it is possible, though not preferred, to arrange for the beacon or beacons to remain a constant distance ahead of the user, at least over a substantial portion of the target path, as the latter seeks to move towards them.

As already noted, the distribution of functionality between mobile devices and the service system is not limited to the distributions described above since the availability of communication resources makes it possible to place functionality where most suitable from technical and commercial considerations. Furthermore, in the foregoing reference to a mobile device is not to be construed as requiring functionality housed in a single unit and the functionality associated with a mobile device can be provided by a local aggregation of units.

The above described methods and arrangements are not limited to use in exhibition halls or similar public or private buildings; the methods and arrangements disclosed can be applied not only to internal spaces but also to external spaces or combinations of the two.

The invention claimed is:

1. An arrangement for guiding a user along a target path, the arrangement comprising:
    user-location determining means for determining the position of the user relative to the target path;
    beacon-location determining means for determining locations at which to position multiple virtual audio beacons such that the audio beacons together form a succession of beacons with each beacon being successively further down said target path onward from the user; and
    audio-beacon means comprising audio output devices carried by the user for rendering virtual audio beacons at the locations determined by the beacon-location determining means.

2. An arrangement according to claim 1, wherein the beacon-location determining means is arranged to effect at least a partial piecewise linear approximation of the target path and to determine the locations from which the audio beacons are to appear to emanate at or relative to the end of respective successive segments of said approximation.

3. An arrangement according to claim 1, wherein the beacon-location determining means is so arranged that as the user approaches or arrives at the first audio beacon in said succession that beacon is removed, the beacon-location determining means being operative to add a new further beacon to the end of succession in time proximity to the removal of the first beacon in said succession, and the beacon-location determining means being further operative to effect this removal and addition of audio beacons repeatedly as the user moves along the target path.

4. An arrangement according to any one of claims 1, wherein the audio-beacon means is arranged to cause an audible characteristic of said audio beacons to differ between beacons to indicate the order in which they occur along said path.

5. An arrangement according to claim 4, wherein the audio-beacon means is arranged to cause the audio beacons to sound in the order they occur in said succession and in a cyclic manner.

6. An arrangement according to claim 1, wherein the beacon-location determining means is arranged to determine said location taking into account potential obstructions whereby no such obstructions lie between the user and the audio beacon.

7. A method of guiding a user along a target path, comprising:
    (a) determining the position of the user relative to the target path;
    (b) determining locations at which to position multiple virtual audio beacons such that the audio beacons together form a succession of beacons with each beacon being successively further down said target path onward from the user; and
    (c) rendering audio beacons at the locations determined in (b) through audio output devices carried by the user.

8. A method according to claim 1, wherein as the user approaches or arrives at the first audio beacon in said succession that beacon is removed, a new further beacon being added to the end of succession in time proximity to the removal of the first beacon in said succession, this removal and addition of audio beacons being repeated as the user moves along the target path.

9. A method according to claim 1, wherein an audible characteristic of said audio beacons is varied between beacons to indicate the order in which they occur along said path.

10. A method according to claim 9, wherein the audio beacons sound in the order they occur in said succession and in a cyclic manner.

11. A method according to claim 1, wherein said location is determined taking into account potential obstructions whereby no such obstructions lie between the user and the audio beacon.

12. A method according to claim 1, wherein (b) involves effecting at least a partial piecewise linear approximation of the target path and determining the locations from which the audio beacons appear to emanate at or relative to the end of respective successive segments of said approximation.

* * * * *